(12) United States Patent
Vanderspurt et al.

(10) Patent No.: US 7,744,827 B2
(45) Date of Patent: *Jun. 29, 2010

(54) CATALYTIC TREATMENT OF FUEL TO IMPART COKING RESISTANCE

(75) Inventors: Thomas Vanderspurt, Glastonbury, CT (US); Harry Cordatos, Colchester, CT (US)

(73) Assignee: United Technologies Corporation, Hartford, CT (US)

(*) Notice: Subject to any disclaimer, the term of this patent is extended or adjusted under 35 U.S.C. 154(b) by 970 days.

This patent is subject to a terminal disclaimer.

(21) Appl. No.: 10/778,828

(22) Filed: Feb. 13, 2004

(65) Prior Publication Data

US 2005/0180901 A1 Aug. 18, 2005

(51) Int. Cl.
B01J 8/04 (2006.01)

(52) U.S. Cl. .............. 422/190; 422/211; 502/150; 502/153; 502/154; 208/112; 208/417; 208/79; 208/48; 208/159; 208/113; 244/135 R; 244/117 A; 244/135 A; 244/121; 244/135 C

(58) Field of Classification Search ............... 422/211, 422/190; 502/150, 153, 154; 244/135 R, 244/135 A, 117 A
See application file for complete search history.

(56) References Cited

U.S. PATENT DOCUMENTS

| | | | |
|---|---|---|---|
| 3,565,793 A | 2/1971 | Herbstman et al. | |
| 3,816,301 A * | 6/1974 | Sorgenti | 208/208 R |
| 3,847,298 A * | 11/1974 | Hamilton | 220/88.3 |
| 4,299,991 A | 11/1981 | Velenyi et al. | |
| 4,863,887 A * | 9/1989 | Ohtake et al. | 502/150 |
| 5,151,171 A | 9/1992 | Spadaccini et al. | |
| 5,504,256 A | 4/1996 | Bond et al. | |
| 5,619,855 A | 4/1997 | Burrus | |
| 5,862,858 A | 1/1999 | Wellington et al. | |
| 5,891,584 A | 4/1999 | Coffinberry et al. | |
| 5,922,920 A | 7/1999 | Bond et al. | |
| 6,156,084 A * | 12/2000 | Bonville et al. | 48/61 |
| 6,227,801 B1 | 5/2001 | Liu | |
| 6,253,554 B1 | 7/2001 | Kobayashi et al. | |
| 6,295,803 B1 | 10/2001 | Bancalari | |
| 6,315,815 B1 | 11/2001 | Spadaccini et al. | |
| 6,536,457 B2 | 3/2003 | Dooley | |

(Continued)

FOREIGN PATENT DOCUMENTS

EP 0 645 472 3/1995

(Continued)

OTHER PUBLICATIONS

European Search Report dated May 23, 2005.

(Continued)

*Primary Examiner*—Alexa D. Neckel
*Assistant Examiner*—Kaity V. Handal
(74) *Attorney, Agent, or Firm*—Carlson, Gaskey & Olds

(57) ABSTRACT

A fuel delivery system for a gas turbine engine includes a catalytic device for treating fuel to increase the usable cooling capability of an endothermic fuel. The catalytic device operates to treat and decompose components within in the fuel to render the fuel non-coking beyond 250° F. The catalytic device includes material that initiates reactions, and decomposition of coke forming components within the fuel to non-coke forming components within the fuel.

13 Claims, 1 Drawing Sheet

U.S. PATENT DOCUMENTS

| | | |
|---|---|---|
| 6,584,778 B1 | 7/2003 | Griffiths et al. |
| 6,644,035 B1 | 11/2003 | Yamanaka et al. |
| 6,672,072 B1 | 1/2004 | Giffin, III |
| 6,709,492 B1 | 3/2004 | Spadaccini et al. |
| 6,939,392 B2 | 9/2005 | Huang et al. |
| 7,179,368 B2 | 2/2007 | Rabion et al. |
| 2002/0155045 A1* | 10/2002 | Kumagai et al. ............ 422/190 |
| 2003/0102252 A1 | 6/2003 | Rabion et al. |
| 2005/0137441 A1* | 6/2005 | Cordatos et al. ............ 585/818 |

FOREIGN PATENT DOCUMENTS

| | | |
|---|---|---|
| JP | 02-500443 | 2/1990 |
| JP | 05-179258 | 7/1993 |
| JP | 07-179862 | 7/1995 |
| JP | 11-140462 | 5/1999 |
| JP | 2001-354978 | 12/2001 |
| JP | 2003-518548 | 6/2003 |
| JP | 2003-292974 | 10/2003 |
| WO | 88/03550 | 5/1988 |

OTHER PUBLICATIONS

Japanese Office Action dated Dec. 4, 2007.

* cited by examiner

CATALYTIC TREATMENT OF FUEL TO IMPART COKING RESISTANCE

BACKGROUND OF THE INVENTION

This invention generally relates to fuel delivery system for a gas turbine engine, and specifically to a fuel delivery system including a catalyst for treating fuel to impart coking resistance.

A gas turbine engine typically includes a compressor, a combustor and a turbine. Air entering the compressor is compressed and directed toward a combustor. Fuel is combined with the high-pressure air and ignited. Combustion gases produced in the combustor drive the turbine.

It is common practice to use fuel as a cooling medium for various systems onboard an aircraft. The usable cooling capacity of a particular fuel is limited by the formation of insoluble products referred to as "coke". The formation of coke deposits is dependent on the amount of dissolved oxygen present within the fuel due to prior exposure to air. Reducing the amount of oxygen dissolved within the fuel decreases the rate of coke deposition and increases the maximum allowable temperature.

It is known to remove dissolved oxygen using a gas-permeable membrane disposed within the fuel system. As fuel passes along the gas-permeable membrane, an oxygen partial pressure differential drives oxygen molecules in the fuel diffuse out of the fuel and across the gas-permeable membrane.

Disadvantageously, the size of the fuel deoxygenator increases disproportionably with the requirements for removing oxygen. An increase in oxygen removal from 90% to 99% requires nearly a doubling of deoxygenator size. As appreciated, space aboard an aircraft is limited and any increase in device size affects overall configuration and operation.

Accordingly, it is desirable to develop a fuel delivery system for a gas turbine engine that treats fuel to prevent formation of coke producing components providing for an increase the usable cooling capability of a fuel.

SUMMARY OF INVENTION

This invention is a fuel delivery system for a gas turbine engine including a catalyst for treating fuel to delay formation of coke deposits to increased temperatures.

The fuel delivery system of this invention includes a catalyst that operates in three stages to treat and decompose components within in the fuel to render the fuel non-coking beyond 250° F. The first stage of the catalytic device reacts the dissolved dioxygen with the sulfur compounds typically present within the fuel to form oxidized sulfur compounds like sulfoxides and sulfones. The second stage reacts the most active organic moieties like those containing tertiary hydrogens especially alkyl aromatic tertiary hydrogens with the remaining di-oxygen to form hydroperoxides. The third stage decomposes the hydroperoxides to non-coke inducing organic oxygenates in such a manner as to prevent liberation of oxygen.

Coke is typically formed through a sequence of free radical reactions initiated in some manner, typically by reaction of fuel components with dioxygen. The treatment of the fuel increases the temperature at which coke deposits are formed to increase the usable cooling capacity of the fuel.

Accordingly, the fuel system of this invention increased the usable cooling capability of the fuel by preventing formation of coke through the removal by catalytic reaction of components in the fuel like dioxygen that take part in or initiate the coke forming reactions.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
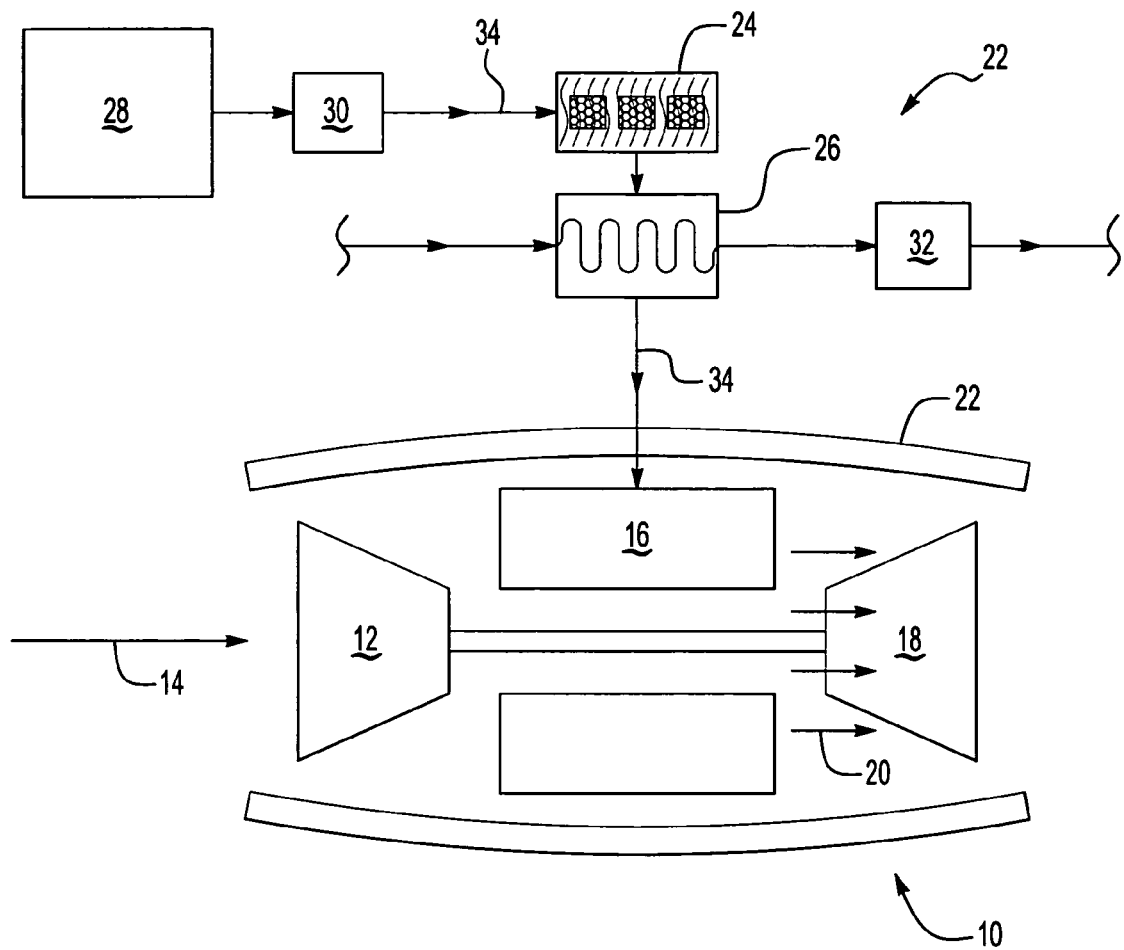
FIG. 1 is a schematic view of a gas turbine engine and fuel delivery system according to this invention.

Referring to FIG. 1, a gas turbine engine assembly 10 includes a compressor 12 a combustor 16 and a turbine 18. Airflow 14 entering the compressor 12 is compressed to a high pressure and directed towards the combustor 16. In the combustor 16, fuel is mixed with the high-pressure air and ignited. Resulting hot combustion gases 20 drive the turbine 18. Fuel is delivered to the combustor through a fuel delivery system 22. Although a gas turbine engine assembly is shown, a worker with the benefit of this disclosure would understand the application to any energy conversion device.

Fuels have long been used as coolants on aircraft because of the capacity to absorb sensible and latent heat. Sensible heat is the heat required to heat the fuel to a boiling point. Latent heat is the heat required to vaporize the fuel. The capacity to absorb sensible and latent heat is known as the fuels physical heat sink. The physical heat sink is limited by formation of insoluble materials formed as a result of dissolved gases and other components reacting with components of the fuel in the presence of heat.

The fuel delivery system 22 includes a catalytic device 24 for treating fuel and preventing formation of undesirable coke deposits at temperatures beyond about 250° F. A pump 30 pumps fuel from a tank 28 to the catalytic device 24 for treatment of the fuel 34. Once the fuel is treated within the catalytic device 24, the fuel has an increased cooling capacity and is used to cool other systems (schematically indicated at 32). The system 32 may include hydraulic and pneumatic systems, or any other system producing waste heat. Fuel 34 from the catalytic device 24 with increased cooling capacity is flowed through a heat exchanger 26. Heat from the other systems 32 is rejected into the fuel passing through the heat exchanger 26. Fuel emerging from the heat exchanger 26 is routed to the combustor 16.

Figure 2:
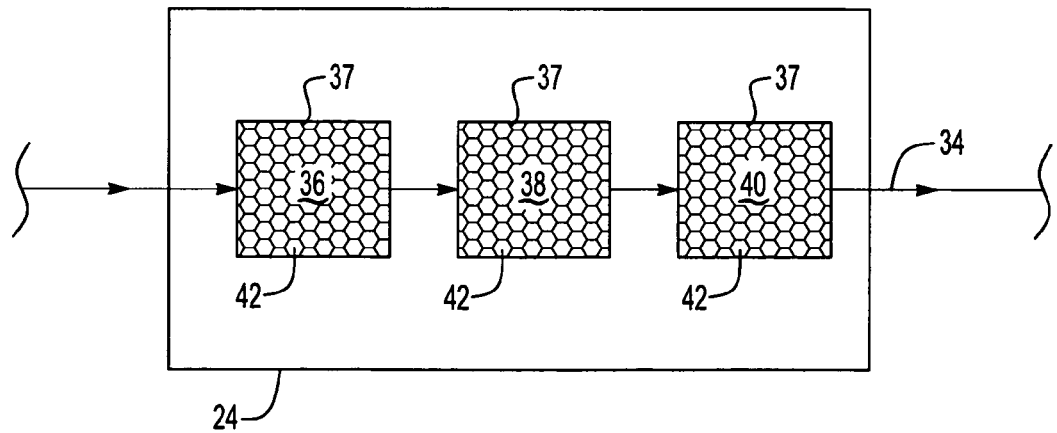
FIG. 2 is a schematic view of a three-stage catalyst according to this invention.

Referring to FIG. 2, the catalytic device 24 is shown schematically and includes first, second and third stages 36, 38, and 40. The different stages 36,38,and 40 do not refer to a specific order, placement or sequence. The reactions within the catalytic device 24 can occur in any order, sequence, and simultaneously. The catalytic device 24 includes catalytic material 37 (shown schematically) that that removes through a sequence of catalytic reactions components within the fuel that would otherwise react under the influence of heat to form coke. Preferably, the catalytic material 37 is supported on structures to encourage contact with fuel flowing through the catalytic device 24. Also preferably the catalytic material 37 is insoluble in the fuel.

Preferably, the catalytic material 37 is supported on a honeycomb structure 42 disposed within the catalytic device 24. However, the catalytic material 37 may be supported on granules, extrudates, monoliths, wire mesh or other known catalyst support structures. The specific support structure is tailored to the catalytic material, and a worker skilled in the art with the benefit of this disclosure would understand how to support differing types of catalytic material to optimize catalytic reaction with components within the fuel.

An example of the catalytic material 37 is a tethered metal ion that is chemically bonded to a support. One form of tethered metal ion is a metal ion like $Fe+3$ or $Cu+2$ that has a coordination capacity of four or more and that has at least two of its coordination capacity satisfied by a chelating molecule that is itself chemically bonded to a fuel insoluble supporting structure. Further, the catalytic material can be in the form of a complex containing two or more metal ions that is chemically bonded to the support structure. Suitable complexes with multiple ions containing the same metal or different metals can be found in U.S. Pat. No. 5,922,920 "Catalytic Production Of Aryl Alkyl Hydroperoxides By Polynuclear Transition Metal Aggregates" and U.S. Pat. No. 5,504,256 "Catalytic Production Of Aryl Alkyl Hydroperoxides By Polynuclear Transition Metal Aggregates" whose disclosures are hereby incorporated in there entirety in this application. The catalytic material can also be an isopolymolybdate, isopolytungstate, a hetropolymolybdate or a heteropolytungstate. A worker having the benefit of this disclosure would understand the specific compositions of catalysts required to facilitate the desired catalytic reactions.

The three stages 36, 38, and 40 of the catalytic device 24 break down and react with different components of the fuel. As such the catalytic material 37 in each of the three stages 36, 38, and 40 may differ depending on the specific application in order to initiate the desired reactions.

In the first stage 36 of the catalytic device 24, the fuel acts as a reductant for converting any peroxides or dissolved oxygen into coking resistant oxygenates. Fuels used for gas turbine engines contain sulfur. Many organosulfur compounds are excellent oxygen traps. That is organosulfur compounds can react with dissolved oxygen in the fuel to form non-coking components that reduce the amount of free dissolved oxygen within the fuel. The first stage 36 contains a catalyst that facilitates this reaction as well as the reaction of any existing hydroperoxides. Typically sulfur compounds like sulfoxides and sulfones are produced and the amount of dissolved oxygen within the fuel decreased.

The second stage 38 within the catalytic device 24 reacts active organic moieties with di-oxygen to form hydroperoxide. Fuels include organic moieties such as branched paraffins, naphthenes or alkyl aromatics. These components are reacted with di-oxygen to form hydroperoxides.

The third stage 40 decomposes the hydroperoxides present within the fuel and formed in the first and second stages. The hydroperoxides are broken down into non-coke producing organic oxygenates in such a way as to prevent the liberation of di-oxygen back into the fuel.

The fuel within the fuel system 22 is heated to a temperature between approximately 50° C. and 100° C. to facilitate initiation of the desired catalytic reactions. The specific temperature of the fuel and the catalytic device 24 can be tailored to the specific fuel composition and catalytic material 37 in order to create a preferred environment that will encourage the desired catalytic reactions.

Fuel exiting the catalytic device 24 includes a different, and preferred composition that substantially prevents the formation of coke within the fuel system. The increased usable cooling capacity of the fuel exiting the catalytic device 24 provides for increased operating temperatures that improve overall engine efficiency.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. An aircraft fuel delivery assembly for supplying fuel to an aircraft engine comprising:
    a catalyst receiving fuel from a fuel tank onboard an aircraft and disposed upstream of the aircraft engine, wherein the catalyst includes;
    a first stage that includes a first catalytic material for converting dissolved oxygen into at least one of a coking resistant oxygenate, a sulfoxide and a sulfones;
    a second stage including a second catalyst material that reacts active organic moieties with di-oxygen to form hydroperoxide; and
    a third stage receiving fuel flow exiting from at least one of said first stage and said second stage, wherein the third stage includes a third catalytic material that decomposes hydroperoxide formed at said second stage and within the fuel into non-coke producing organic oxygenates.

2. The assembly as recited in claim 1, wherein at least one of said first second and third catalytic materials comprises tethered metal ions.

3. The assembly as recited in claim 1, wherein at least one of said first, second and third catalytic materials comprises poly-metal ion complexes.

4. The assembly as recited in claim 1, wherein at least one of said catalytic materials is chemically bonded to a support structure exposed to fuel flow.

5. A catalyst assembly for a fuel delivery system comprising:
    a first stage receiving fuel from a fuel tank on board an aircraft, the first stage including a first catalytic material for converting sulfur components in fuel to sulfoxides and sulfones;
    a second stage including a second catalytic material for converting components within said fuel to form hydroperoxide; and
    a third stage receiving fuel from at least one of the first stage and the second stage, wherein said third stage includes a third catalytic material for decomposing hydroperoxide within said fuel to form non-coke producing components.

6. The assembly as recited in claim 5, wherein said non-coke producing components formed in said third stage comprise organic oxygenates.

7. The assembly as recited in claim 5, wherein a portion of said catalyst assembly comprises tethered metal ions.

8. The assembly as recited in claim 5, wherein a portion of said catalyst comprises poly-metal ion complexes.

9. The assembly as recited in claim 5, comprising catalytic components chemically bonded to a support structure exposed to fuel flow.

10. An aircraft fuel delivery assembly for supplying fuel to an aircraft engine comprising:
    a catalyst mountable in fluid communication with a fuel stream between a fuel tank on-board an aircraft and the aircraft engine, wherein the catalyst includes;

a first stage that includes a first catalytic material for converting dissolved oxygen into at least one of a coking resistant oxygenate, a sulfoxide and a sulfones;

a second stage including a second catalyst material that reacts active organic moieties with di-oxygen to form hydroperoxide; and a third stage receiving fuel flow exiting from at least one of said first stage and said second stage, wherein the third stage includes a third catalytic material that decomposes hydroperoxide formed at said second stage and within the fuel into non-coke producing organic oxygenates.

11. The assembly as recited in claim 10, wherein at least one of said first second and third catalytic materials comprises tethered metal ions.

12. The assembly as recited in claim 10, wherein at least one of said first, second and third catalytic materials comprises poly-metal ion complexes.

13. The assembly as recited in claim 10, wherein at least one of said catalytic materials is chemically bonded to a support structure exposed to fuel flow.

* * * * *